(12) United States Patent
Xu et al.

(10) Patent No.: US 10,712,732 B2
(45) Date of Patent: Jul. 14, 2020

(54) SLAVE DEVICE, MASTER DEVICE, AND INDUSTRIAL NETWORK SYSTEM

(71) Applicant: OMRON Corporation, Kyoto (JP)

(72) Inventors: Ziqiang Xu, Kusatsu (JP); Junji Shimamura, Takatsuki (JP); Hirohito Mizumoto, Otsu (JP)

(73) Assignee: OMRON Corporation, Kyoto (JP)

( * ) Notice: Subject to any disclaimer, the term of this patent is extended or adjusted under 35 U.S.C. 154(b) by 109 days.

(21) Appl. No.: 16/127,255

(22) Filed: Sep. 11, 2018

(65) Prior Publication Data
US 2019/0129391 A1 May 2, 2019

(30) Foreign Application Priority Data

Oct. 26, 2017 (JP) .................................. 2017-207195

(51) Int. Cl.
*G05B 19/418* (2006.01)
*B25J 3/04* (2006.01)
*G05B 19/042* (2006.01)

(52) U.S. Cl.
CPC .......... *G05B 19/41845* (2013.01); *B25J 3/04* (2013.01); *G05B 19/4185* (2013.01); *G05B 19/0426* (2013.01); *G05B 2219/39055* (2013.01); *G05B 2219/39468* (2013.01)

(58) Field of Classification Search
CPC .......... G05B 19/41845; G05B 19/4185; G05B 19/0426; G05B 2219/39055; G05B 2219/39468; B25J 3/04
See application file for complete search history.

(56) References Cited

U.S. PATENT DOCUMENTS

| 4,679,297 | A | * | 7/1987 | Hansen, Jr. | ............ | B23Q 7/046 414/806 |
| 2005/0065647 | A1 | | 3/2005 | Perry et al. | | |
| 2009/0044655 | A1 | | 2/2009 | DeLouis et al. | | |
| 2010/0241260 | A1 | * | 9/2010 | Kilibarda | ............... | B25J 9/1602 700/95 |
| 2017/0057085 | A1 | * | 3/2017 | Cookson | ................ | B25J 9/1646 |
| 2019/0243333 | A1 | * | 8/2019 | Yoon | .................... | G05B 19/418 |

FOREIGN PATENT DOCUMENTS

| EP | 3135443 | 3/2017 |
| JP | H09174474 | 7/1997 |
| WO | 2015179099 | 11/2015 |

OTHER PUBLICATIONS

"Search Report of Europe Counterpart Application", dated Mar. 11, 2019, p. 1-p. 8.

* cited by examiner

*Primary Examiner* — Christine Ng
(74) *Attorney, Agent, or Firm* — JCIPRNET

(57) ABSTRACT

To reduce the working hours of a user in an operation and improve an operation rate in an industrial network system. A communication setting change part is provided which automatically changes, in a timing of an end effector replacement, the communication setting in a communication part according to the communication information that corresponds to an end effector.

9 Claims, 7 Drawing Sheets

SLAVE DEVICE, MASTER DEVICE, AND INDUSTRIAL NETWORK SYSTEM

CROSS-REFERENCE TO RELATED APPLICATION

This application claims the priority of Japan patent application serial no. 2017-207195, filed on Oct. 26, 2017. The entirety of the above-mentioned patent application is hereby incorporated by reference herein and made a part of this specification.

BACKGROUND

Technical Field

The disclosure relates to a slave device, a master device, and an industrial network system.

Related Art

In the field of factory automation (FA), various types of devices share processes of an operation and control is performed. In order to coordinate various controllers, remote I/O, and manufacturing devices which are used in an operation in a specific field such as factory facilities, an industrial network system, also referred to as a field network, which connects these devices is constructed.

In plenty of industrial network systems, a manufacturing process is controlled by connecting a master device to various slave devices operating in accordance with the control of the master device and conducting communication.

An end effector is connected to each slave device. The end effector is detachable to the corresponding slave device. In each slave device, the end effector mounted thereon can be replaced in accordance with the operation purpose (see Japanese Laid Open No. H9-174474 (published on Jul. 8, 1997)).

The replacing of the end effector mounted on the slave device is also called an "end effector replacement". In addition, the end effector removed from the slave device in an end effector replacement is also called an "end effector before replacement", and the end effector mounted on the slave device in an end effector replacement is also called an "end effector after replacement". That is, the end effector replacement can be explained as an operation in which the end effector before replacement is removed from the slave device and the end effector after replacement is mounted on the slave device.

A communication form between the slave device and the end effector before replacement may be different from the communication form between the slave device and the end effector after replacement. Besides, an example of the difference in the communication form includes the difference in communication medium (such as cable, optical fiber, wireless), the difference in communication mode (such as data rate, whether or not corresponding to high speed communication configuration), and the difference in protocol.

In such a case, during the end effector replacement, a user is required to perform, to the slave device, settings related to the communication form between the slave device and the end effector after replacement. As a result, every time the communication form between the slave device and the end effector before replacement is different from the communication form between the slave device and the end effector after replacement, the setting done to the slave device by the user is required. Therefore, in the industrial network system, there is a problem that the working hours of the user in the operation increases.

In addition, in order to perform the settings related to the communication form between the slave device and the end effector after replacement to the slave device, the industrial network system is usually stopped temporarily. As a result, there is a problem that an operation rate of the industrial network system decreases.

One aspect of the disclosure provides a slave device, a master device, and an industrial network system which are capable of decreasing the working hours of the user in the operation and increasing the operation rate in an industrial network system.

SUMMARY

A slave device of one aspect of the disclosure is related to an end effector replacement in which an end effector before replacement is removed from the slave device and an end effector after replacement is mounted on the slave device and includes: a communication part, which communicates with the end effector after replacement mounted on the slave device after the end effector replacement; a storage part, which stores, with regard to each of a plurality of attachable end effectors that are attachable to the slave device, communication information related to a communication form between the slave device and the attachable end effector; and a communication setting change part, which automatically changes the communication setting in the communication part according to the communication information which corresponds to the end effector after replacement in a timing of the end effector replacement when the end effector after replacement is one of the plurality of attachable end effectors.

In addition, a master device of one aspect of the disclosure sends an instruction of performing the end effector replacement to any one of the slave devices.

In addition, an industrial network system of one aspect of the disclosure includes any one of the above slave devices; and a master device which sends an instruction of performing the end effector replacement to the slave device.

DESCRIPTION OF THE EMBODIMENTS

Next, an embodiment of one aspect of the disclosure (also referred to as "the embodiment" hereinafter) is described with reference to FIG. 1-FIG. 8. Besides, for the convenience of description, a member having the same function as a member that is already described may be denoted by the same symbol without repeating the description.

§ 1 Application Example

Figure 1:
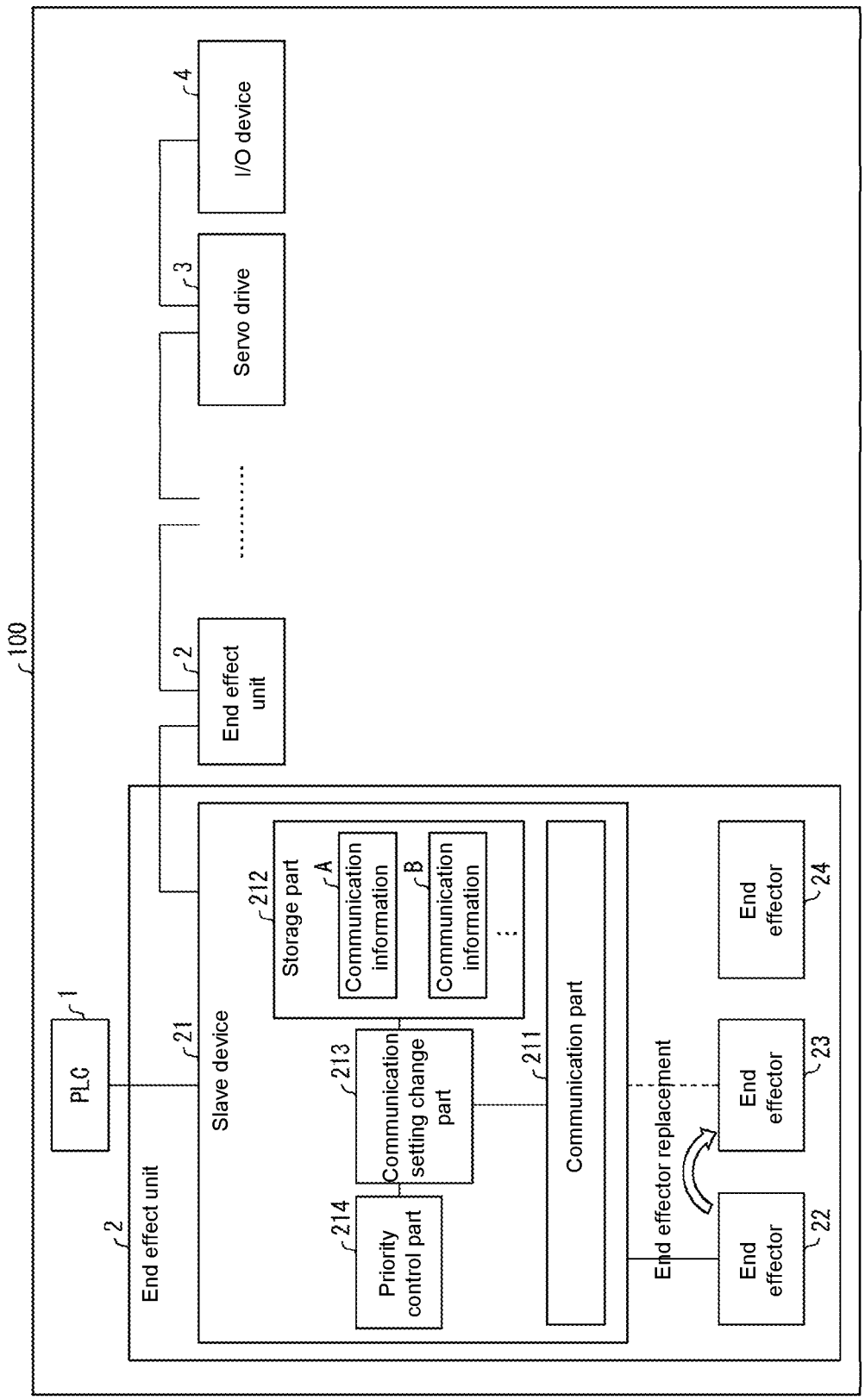
FIG. 1 is a block diagram showing a configuration of an industrial network system of an embodiment of the disclosure.

FIG. 1 is a block diagram showing a configuration of an industrial network system 100 of the embodiment.

Figure 2:
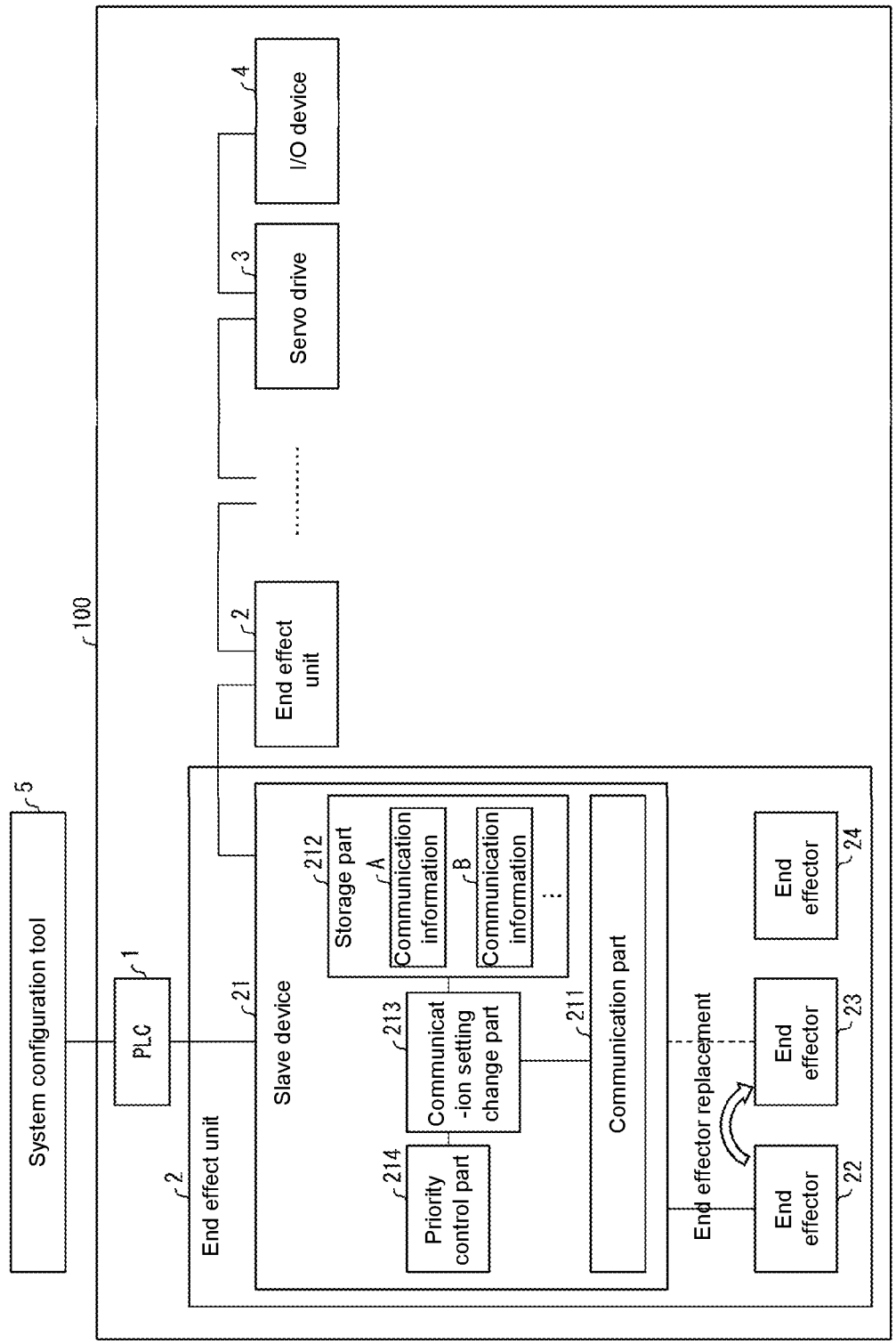
FIG. 2 is a block diagram showing a situation of storing communication information in a storage part of the industrial network system shown in FIG. 1.

FIG. 2 is a block diagram showing a situation of storing communication information in a storage part 212 of the industrial network system 100.

As shown in FIG. 1, a slave device 21 includes a communication part 211, a storage part 212, a communication setting change part 213, and a priority control part 214. The communication part 211 communicates with an end effector 23 mounted on the slave device 21 after an end effector replacement. The storage part 212 stores, with regard to each of a plurality of attachable end effectors that are attachable to the slave device 21, communication information related to a communication form between the slave device 21 and the attachable end effector. Besides, it is not necessary for the plurality of attachable end effectors to include at least one of the end effectors 22-24. In addition, in FIG. 1, each of the plurality of communication information respectively corresponding to the plurality of attachable end effectors is denoted by symbols of communication information A, communication information B and so on. When the end effector 23 is one of the plurality of attachable end effectors, the communication setting change part 213 automatically changes the communication setting in the communication part 211 according to the communication information that corresponds to the end effector 23 in a timing of the end effector replacement. The priority control part 214 controls the priority of tasks in the communication setting change part 213.

According to the slave device 21, when the end effector 23 is one of the plurality of attachable end effectors, in the timing of the end effector replacement, the communication setting change part 213 changes the communication setting in the communication part 211 according to the communication information that corresponds to the end effector 23. Accordingly, in the timing, the communication setting of the communication part 211 is automatically changed to the one which is most suitable for the communication between the communication part 211 and the end effector 23. As a result, it is not necessary for the user to perform setting to the slave device 21 every time the communication form between the slave device 21 and the end effector 22 is different from the communication form between the slave device 21 and the end effector 23. Therefore, in the industrial network system 100, the working hours of the user in the operation can be reduced. In addition, even if the industrial network system 100 is not stopped temporarily, the setting related to the communication form between the slave device 21 and the end effector 23 can be performed. As a result, the operation rate of the industrial network system 100 can be improved.

The communication setting change part 213 may change the communication setting in the communication part 211 concurrently with the movement of the slave device 21 conducted in the end effector replacement. Accordingly, the timing for finishing both the end effector replacement and the change of communication setting can be quickened.

In addition, when the slave device 21 receives one predetermined command from a host device (for example, a PLC1 described below), the end effector replacement and the change of communication setting in the communication part 211 done by the communication setting change part 213 may be collectively performed. Accordingly, the slave device 21 which is easier for the user to handle can be realized.

In addition, when the time for the communication setting change part 213 to change the communication setting in the communication part 211 is longer than the time required for the movement of the slave device 21 conducted in the end effector replacement, the priority control part 214 may raise the priority of tasks in the communication setting change part 213. Accordingly, the time to performed the change of communication setting can be shortened (or be eliminated) no matter the change of communication setting is before or after the end effector replacement. Accordingly, the timing for finishing both the end effector replacement and the change of communication setting can be quickened.

In addition, when the end effector 23 is not one of the plurality of attachable end effectors, in the timing of the end effector replacement, the communication setting change part 213 may automatically and sequentially change the communication setting in the communication part 211 according to the communication information related to each of the plurality of attachable end effectors, until the communication part 211 is communicable with the end effector 23. Accordingly, even in a case of the end effector 23 of which the communication information is not stored in the storage part 212, the effect equivalent to the case of the end effector of which the communication information is stored in the storage part 212 can be obtained.

§ 2 Configuration Example

Next, the industrial network system 100 equipped with the slave device 21 is described with reference to FIG. 1 and FIG. 2.

The industrial network system 100 is, for example, a network in accordance with the standard of EtherCAT (registered trademark), and is built in a factory and the like to be used as a FA system. The industrial network system 100 includes a programmable logic controller (referred to as "PLC" hereinafter) 1, multiple groups (two groups here) of end effect units 2, a servo drive 3, and an I/O device 4. In the embodiment, regarding the multiple groups of end effect units 2, the description is focused on any group of the multiple groups of end effect unit 2. The end effect unit 2 includes the slave device 21, and the end effectors 22-24.

The PLC (master device) 1 sends an information signal containing control data through the network in accordance with a program and/or an operation. The end effect unit 2 receives the information signal and acts according to the control data. The PLC1 controls the content and timing of the action so that the end effect unit 2 operates, thereby achieving production in the factory containing the industrial network system 100. In addition, the PLC1 communicates with the servo drive 3 and the I/O device 4. The PLC1 controls the servo drive 3 and the I/O device 4 so that the end effect unit 2 can operate as mentioned above. An example of the function of the PLC1 includes execution of a PLC program and a robot program, sending of an instruction to the end effect unit 2 and/or the servo drive 3, and refresh of the I/O device 4.

The slave device 21 is connected to the PLC1. In accordance with the instruction from the PLC1, the slave device 21 controls a manipulator (not illustrated) to move a robot arm and/or a machine tool (not illustrated) of the slave device 21, or controls the operation of the robot arm and/or the machine tool.

Each of the end effectors 22-24 is also called an end effector. All of the end effectors 22-24 may be mounted on the slave device 21. On the other hand, while one of the end effectors 22-24 is mounted on the slave device 21, the rest two of the end effectors 22-24 are not mounted on the slave device 21. When the end effector 22 is mounted on the slave device 21, the slave device 21 can perform operations which use the end effector 22. Similarly, when the end effector 23 is mounted on the slave device 21, the slave device 21 can perform operations which use the end effector 23. Similarly, when the end effector 24 is mounted on the slave device 21, the slave device 21 can perform operations which use the end effector 24. Each of the end effectors 22-24 has a function to receive the information signal from the PLC1 and the slave device 21 and directly work on a target object (not illustrated) according to the control data contained in the information signal when mounted on the slave device 21.

In the embodiment, an example of an end effector replacement is described in which the end effector mounted on the slave device 21 is replaced from the end effector (end effector before replacement) 22 to the end effector (end effector after replacement) 23. In the end effector replacement, the end effector 22 is removed from the slave device 21 and the end effector 23 is mounted on the slave device 21.

In addition, the communication form between the slave device 21 and the end effector 22 is different from the communication form between the slave device 21 and the end effector 23. Besides, an example of the difference in the communication form includes the difference in communication medium (such as cable, optical fiber, wireless), the difference in communication mode (such as data rate, whether or not corresponding to high speed communication configuration), and the difference in protocol.

The servo drive 3 controls the operation of a servo motor (not illustrated) in accordance with the instruction of the PLC1. The I/O device 4 inputs and outputs digital quantity and analog quantity in the industrial network system 100.

Here, the slave device 21 includes the communication part 211, the storage part 212, the communication setting change part 213, and the priority control part 214. The communication part 211 communicates with the end effector 23 mounted on the slave device 21 after the end effector replacement. The storage part 212 stores, with regard to each of the plurality of attachable end effectors that are attachable to the slave device 21, the communication information related to the communication form between the slave device 21 and the attachable end effector. Besides, it is not necessary for the plurality of attachable end effectors to include at least one of the end effectors 22-24. In addition, in FIG. 1, each of the plurality of communication information respectively corresponding to the plurality of attachable end effectors is denoted by symbols of communication information A, communication information B and so on. When the end effector 23 is one of the plurality of attachable end effectors, the communication setting change part 213 automatically changes the communication setting in the communication part 211 according to the communication information that corresponds to the end effector 23 in the timing of the end effector replacement. The priority control part 214 controls the priority of tasks in the communication setting change part 213.

Moreover, the writing of the communication information A, the communication information B and so on into the storage part 212 is performed, as shown in FIG. 2 for example, using a system configuration tool 5. Specifically, each of the plurality of attachable end effectors has a definition file to define itself. The system configuration tool 5 reads out the definition file from each of the plurality of attachable end effectors. Then, the system configuration tool 5 writes, for each of the plurality of attachable end effectors, the information which is contained in the definition file and related to the communication form between the slave device 21 and the attachable end effector into the storage part 212 as the communication information. Besides, as shown in FIG. 2, it may also be that the system configuration tool 5 is connected to the PLC1, and the communication information A, the communication information B and so on are written into the storage part 212 by the system configuration tool 5 via the PLC1 (that is, in a range of a general control by the PLC1). In addition, although not shown in FIG. 2, it may also be that the system configuration tool 5 is connected to the slave device 21, and the system configuration tool 5 directly (that is, independent of the general control by the PLC1) performs the writing of the communication information A, the communication information B and so on into the storage part 212 to the slave device 21.

According to the industrial network system 100, when the end effector 23 is one of the plurality of attachable end effectors, in the timing of the end effector replacement, the communication setting change part 213 changes the communication setting in the communication part 211 according to the communication information that corresponds to the end effector 23. Accordingly, in the timing, the communication setting of the communication part 211 is automatically changed to the one which is most suitable for the communication between the communication part 211 and the end effector 23. As a result, it is not necessary for the user to perform setting to the slave device 21 every time the communication form between the slave device 21 and the end effector 22 is different from the communication form between the slave device 21 and the end effector 23. Therefore, in the industrial network system 100, the working hours of the user in the operation can be reduced. In addition, even if the industrial network system 100 is not stopped temporarily, the setting related to the communication form between the slave device 21 and the end effector 23 can be performed. As a result, the operation rate of the industrial network system 100 can be improved.

Figure 3:
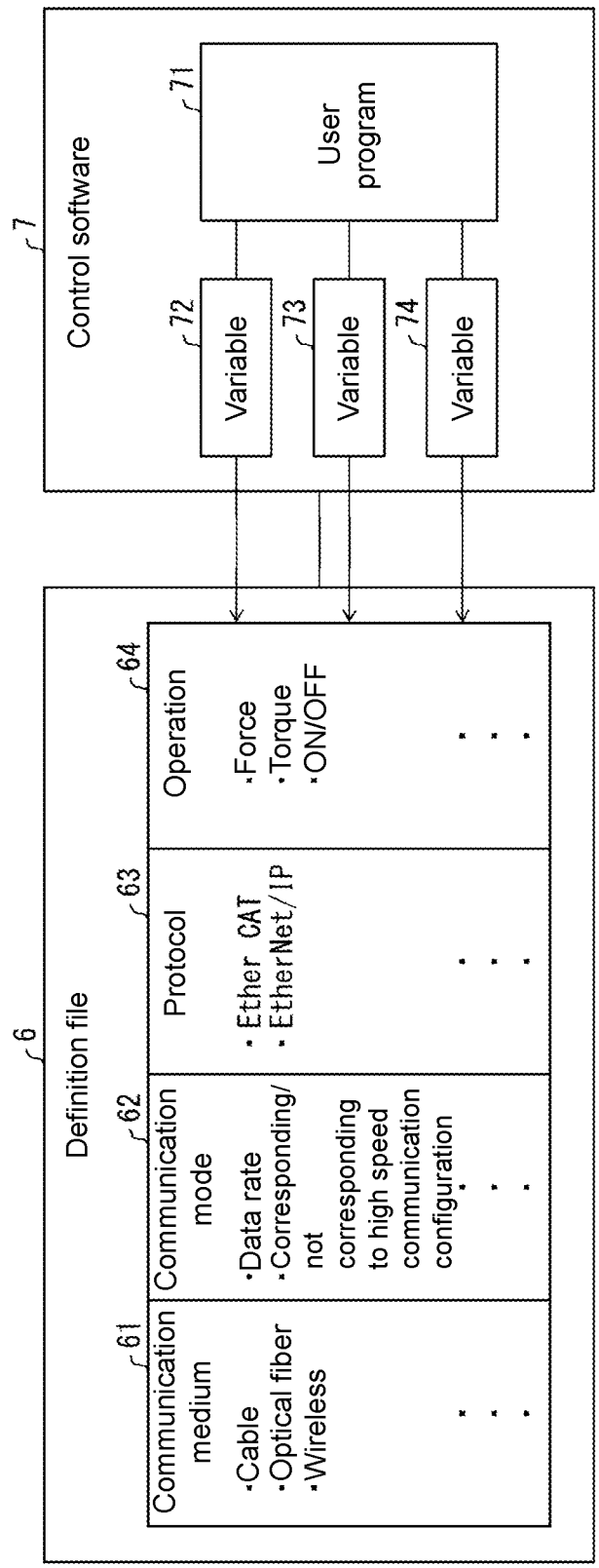
FIG. 3 is an image drawing showing a situation in which a user controls a definition file that defines an end effector.

FIG. 3 is an image drawing showing a situation in which the user controls a definition file 6 which defines the end effector (referred to as "the target end effector" hereinafter) taking each of the plurality of attachable end effectors as a representation. When the industrial network system 100 is a network in accordance with the standard of EtherCAT (registered trademark), an EtherCAT Slave Information (ESI) file is taken as an example of the definition file 6.

The definition file 6 contains information 61-64. The information 61 is the information related to the communication medium of the communication between the slave device 21 and the target end effector. The information 62 is the information related to the communication mode of the communication. The information 63 is the information related to the protocol of the communication. The information 64 is the information related to the operation control (for example, a force by which the target end effector grips the target object, a torque of the target end effector, ON/OFF of the target end effector) to the target end effector in the communication.

The information 61-63 is the communication information corresponding to the target end effector, and the communication setting change part 213 automatically changes the communication setting in the communication part 211 in accordance with the information 61-63 specifically. On the other hand, the operation control to the target end effector based on the information 64 is performed by the user by means of control software 7 containing a user program 71. Specifically, the instruction is output from the user program 71, so that variables 72-74 are appropriately written into the information 64, or the information related to the operation of the target end effector obtained from the information 64 is obtained by the user program 71 and reflected in the following control.

According to the industrial network system 100, among the information 61-64, only the information 64 becomes a target which the user consciously controls. Therefore, in the industrial network system 100, it is unnecessary for the user to consciously perform the control related to the information 61-63, and the working hours of the user in the operation is reduced accordingly.

Figure 4:
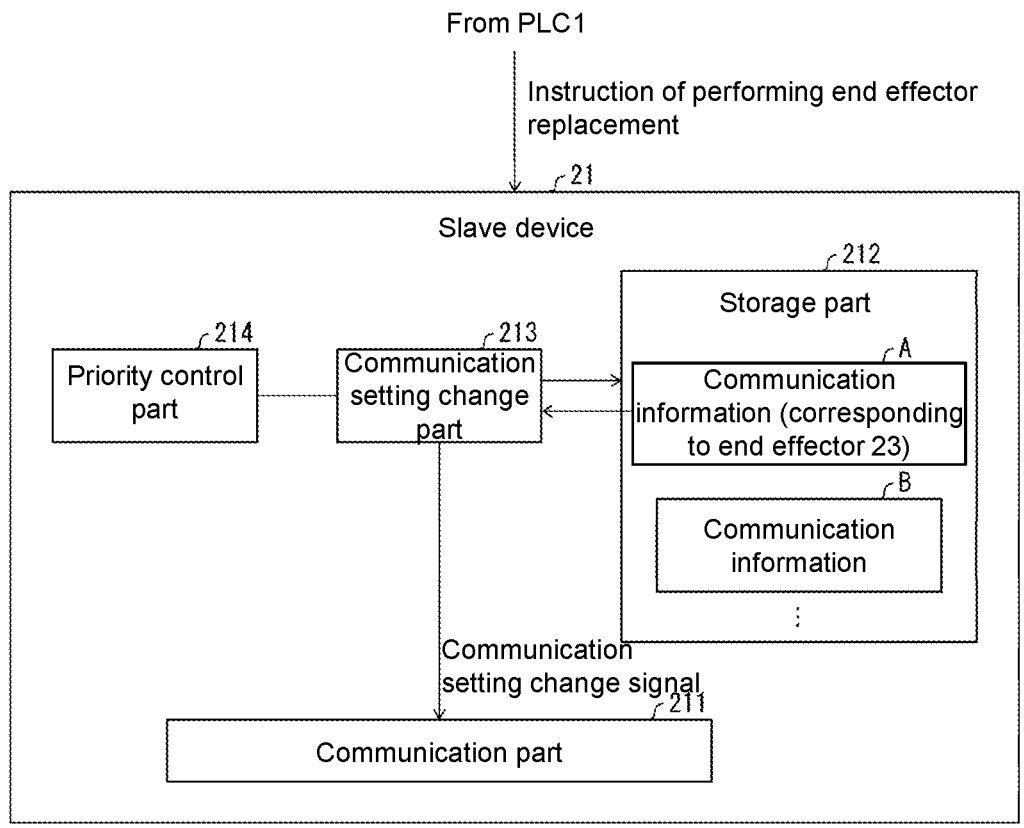
FIG. 4 is a block diagram showing a flow of various signals related to an operation of a slave device of the industrial network system shown in FIG. 1.

FIG. 4 is a block diagram showing a flow of various signals related to the operation of the slave device 21 of the industrial network system 100. Here, an example is described in which the communication information A is the communication information corresponding to the end effector 23.

The instruction of performing an end effector replacement is sent from the PLC1 to the slave device 21. Obviously, it is also contained in the instruction that the end effector mounted on the slave device 21 in the end effector replacement is the end effector 23. When the slave device 21 receives the instruction, the communication setting change part 213 reads out the communication information A corresponding to the end effector 23 from the storage part 212. Then, the communication setting change part 213 create a communication setting change signal based on the communication information A, and changes the communication setting in the communication part 211 to a communication setting most suitable for the communication between the communication part 211 and the end effector 23 in accordance with the communication setting change signal.

Figure 5:
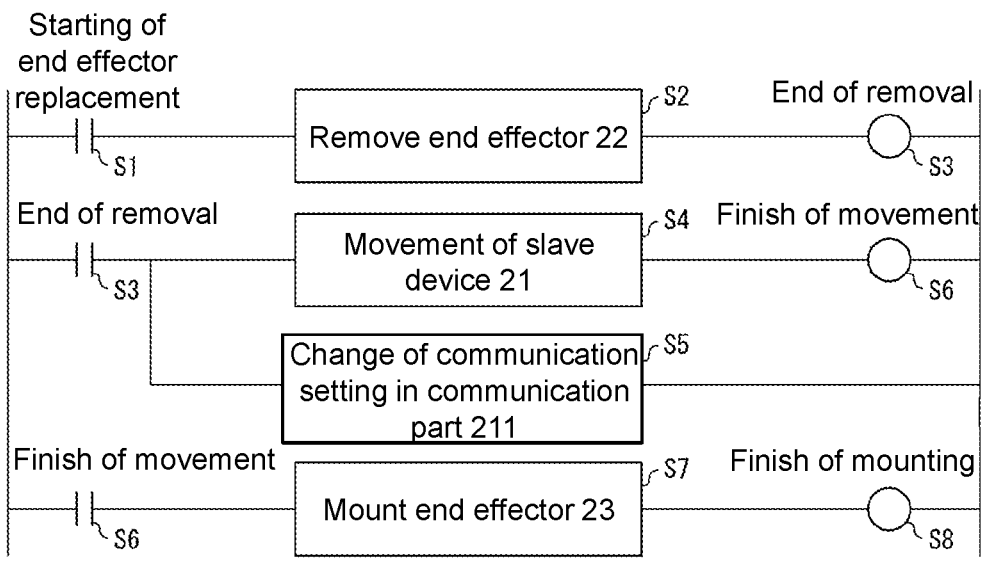
FIG. 5 is a ladder diagram showing a flow of an end effector replacement, and a flow of changing communication settings in a communication part by a communication setting change part.

FIG. 5 is a ladder diagram showing the flow of the end effector replacement, and the flow of changing the communication setting in the communication part 211 by the communication setting change part 213.

First, the slave device 21 receives the instruction of performing the end effector replacement from the PLC1 (step S1). Next, the following steps S2-S8 are conducted in accordance with the instruction.

First, the slave device 21 removes the end effector 22 from the slave device 21 (step S2). When the end effector 22 is removed from the slave device 21 in step S2 (step S3), the slave device 21 moves so that the attachment part (not illustrated) of the end effector in the slave device 21 is located above the end effector 23 (step S4). Furthermore, concurrently with step S4, the communication setting change part 213 changes the communication setting in the communication part 211 to a communication setting most suitable for the communication between the communication part 211 and the end effector 23 (step S5). After that, when the movement of the slave device 21 shown in step S4 is finished (step S6), the slave device 21 mounts the end effector 23 on the slave device 21 (step S7), after which the mounting is finished (step S8).

According to the ladder diagram shown in FIG. 5, concurrently with the movement (see step S4 and S6) of the slave device 21 conducted in the end effector replacement, the communication setting change part 213 changes the communication setting in the communication part 211 (see step S5). As a result, the timing for finishing both the end effector replacement and the change of communication setting (correspond to step S8) can be quickened.

In addition, according to the ladder diagram shown in FIG. 5, when the slave device 21 receives the instruction (one predetermined command) of performing the end effector replacement from the PLC (host device) 1, the end effector replacement and the change of communication setting in the communication part 211 done by the communication setting change part 213 are performed collectively. As a result, the slave device 21 which is easier for the user to handle can be realized.

In addition, when the time for the communication setting change part 213 to change the communication setting in the communication part 211 (the time of step S5) is longer than the time required for the movement of the slave device 21 conducted in the end effector replacement (that is, the time from the beginning of step S4 to the end of step S6), the priority control part 214 raises the priority of the tasks in the communication setting change part 213. Accordingly, the time to change the communication setting can be shortened (or be eliminated) no matter the change is performed before or after the end effector replacement (that is, before step S1, or after step S8). As a result, the timing for finishing both the end effector replacement and the change of communication setting (corresponding to step S8) can be quickened.

In the task scheduling of the software, usually priorities are applied to the tasks, the task with a high priority is conducted preferentially, the task with a low priority is conducted after the task with a high priority is finished, and the tasks with the same priority are conducted alternatively. In the slave device 21, the control of movement thereof is the main task, and the change of communication setting is an auxiliary function, so that it is defaulted that the movement of the slave device 21 has a high priority and the change of communication setting has a low priority. Because the slave device 21 calculates a track of the movement, the time required to finish the movement can be predicted. The time to change the communication setting is a sum of a software treatment time and a hardware access time in the communication part 211, and is a fixed value. When the slave device 21 compares the two and determines that the change of communication setting cannot be finished before the movement is finished, the priority control part 214 temporarily raises the priority of the tasks in the communication setting change part 213. When the change of communication setting is finished, the priority control part 214 restores the priority of the tasks in the communication setting change part 213 to the default low priority.

Figure 6:
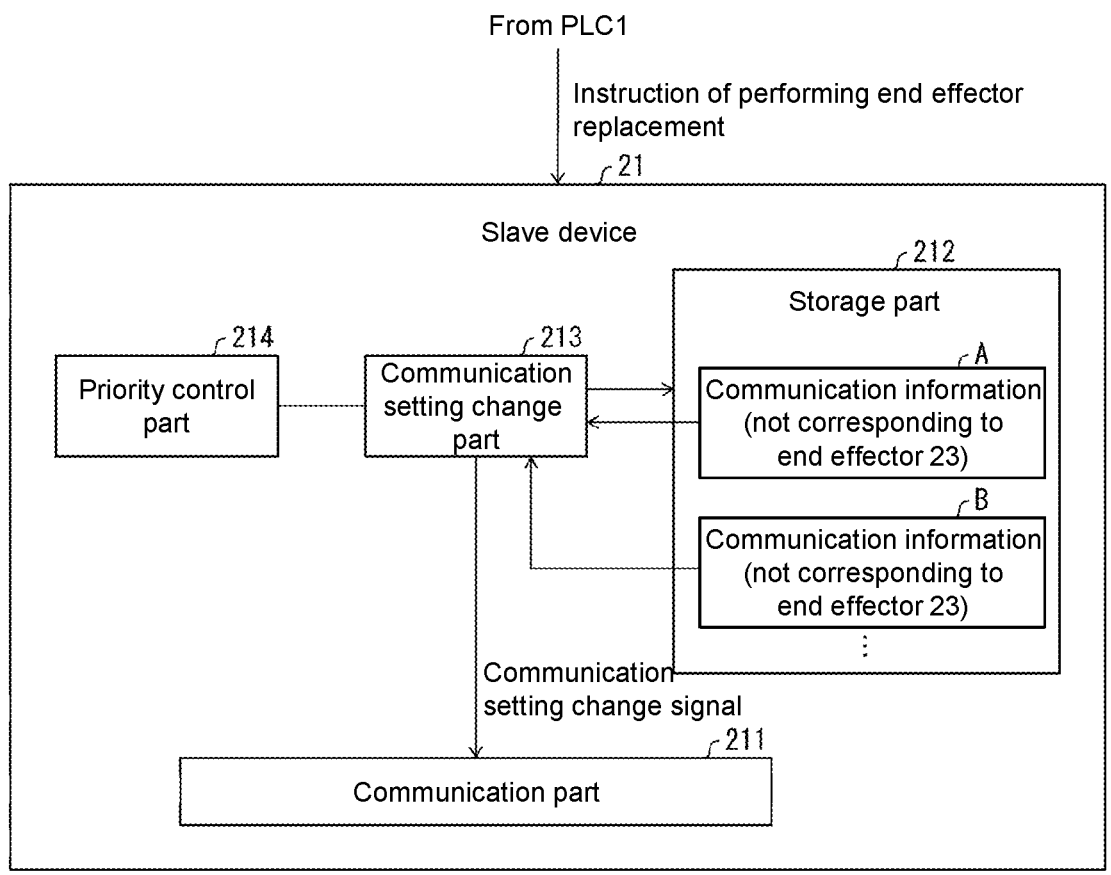
FIG. 6 is a block diagram showing another flow of various signals related to an operation of the slave device of the industrial network system shown in FIG. 1.

FIG. 6 is a block diagram showing another flow of various signals related to the operation of the slave device 21 of the industrial network system 100. Here, an example is described in which the communication information corresponding to the end effector 23 is not stored in the storage part 212.

When the slave device 21 receives the instruction of performing the end effector replacement, the communication setting change part 213 is going to read out the communication information corresponding to the end effector 23 from the storage part 212. However, as mentioned above, the communication information corresponding to the end effector 23 is not stored in the storage part 212.

In such a case, first, the communication setting change part 213 create a communication setting change signal according to the communication information A, and changes the communication setting in the communication part 211 according to this communication setting change signal. Then, the slave device 21 confirms whether the communication part 211 is communicable with the end effector 23 by the communication setting in the communication part 211 which is changed according to the communication information A. When the communication part 211 is communicable with the end effector 23 by the above communication setting, the above communication setting is determined to be the communication setting in the communication part 211.

When the communication part 211 is not communicable with the end effector 23 by this communication setting, the communication setting change part 213 continues to create a communication setting change signal according to the communication information B, and changes the communication setting in the communication part 211 according to this communication setting change signal. Then, the slave device 21 confirms whether the communication part 211 is communicable with the end effector 23 by the communication setting in the communication part 211 which is changed according to the communication information B. When the communication part 211 is communicable with the end effector 23 by the above communication setting, the above communication setting is determined to be the communication setting in the communication part 211.

When the communication part 211 is not communicable with the end effector 23 by this communication setting, the communication setting change part 213 continues to create a communication setting change signal according to the communication information (not illustrated) other than the communication information A and B and stored in the storage part 212, and changes the communication setting in the communication part 211 according to this communication setting change signal. Then, the slave device 21 confirms whether the communication part 211 is communicable with the end effector 23 by the communication setting in the communication part 211 which is changed according to the above communication information. When the communication part 211 is communicable with the end effector 23 by the above communication setting, the above communication setting is determined to be the communication setting in the communication part 211.

Then, the slave device 21 repeats the same procedures until the communication part 211 is communicable with the end effector 23.

That is, when the end effector 23 is not one of the plurality of attachable end effectors, in the timing of the end effector replacement, the communication setting change part 213 automatically and sequentially changes the communication setting in the communication part 211 according to the communication information related to each of the plurality of attachable end effectors, until the communication part 211 is communicable with the end effector 23. As a result, even in the case of the end effector 23 of which the communication information is not stored in the storage part 212, the effect equivalent to the case of the end effector of which the communication information is stored in the storage part 212 can be obtained.

Figure 7:
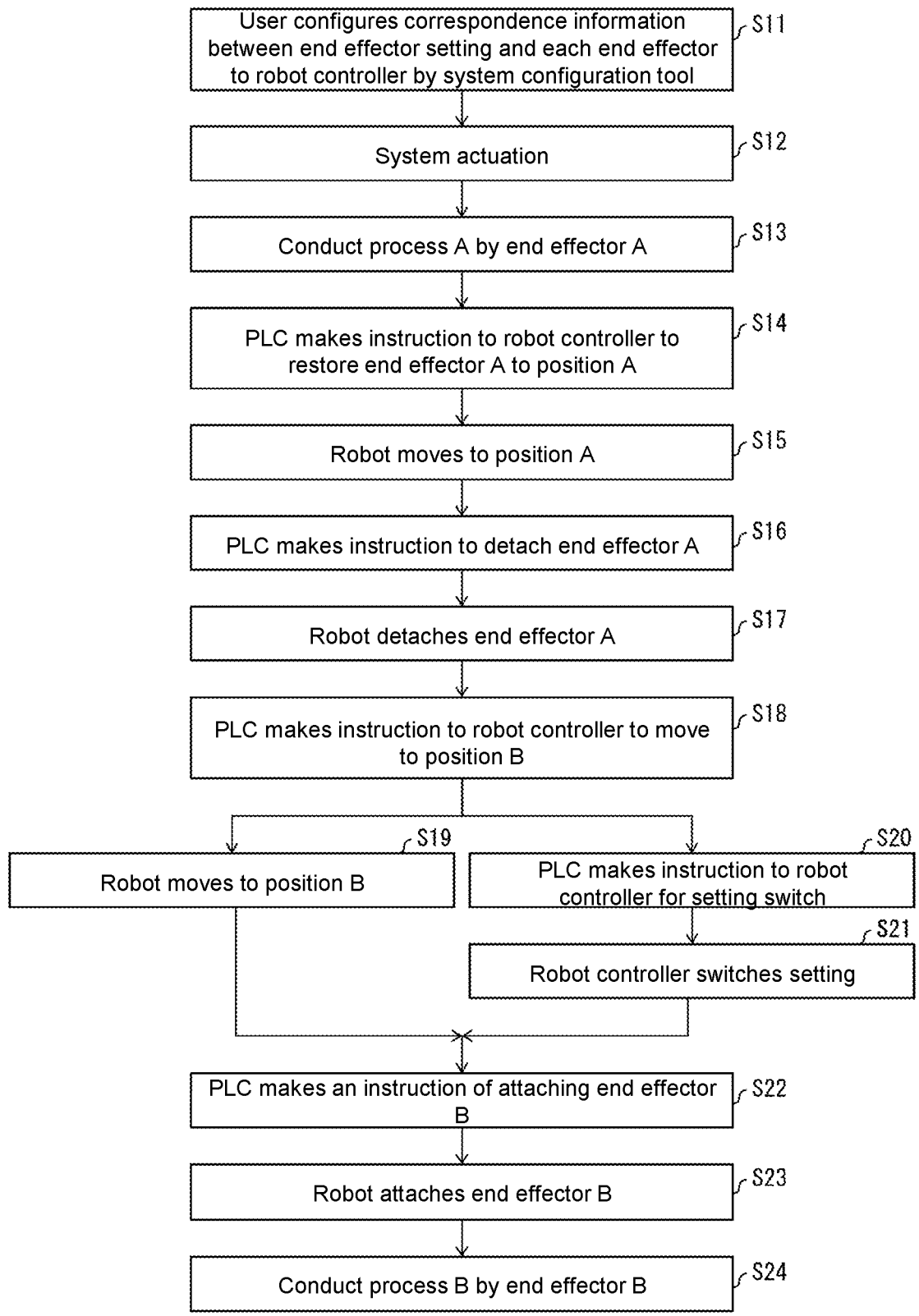
FIG. 7 is a flow chart showing a flow of an operation of the industrial network system shown in FIG. 1.

FIG. 7 is a flow chart showing a flow of the operation of the industrial network system 100.

First, the user uses the system configuration tool 5 to write, into the storage part 212, the communication information A, the communication information B and so on which are related to the communication form between the slave device 21 and the attachable end effector with regard to each of the plurality of attachable end effectors (step S11). Next, the user actuates the industrial network system 100. That is, the general control to the slave device 21 done by the PLC1 is started. At this moment, the end effector 22 is mounted on the slave device 21 (step S12). Next, the slave device 21 performs a predetermined operation in which the end effector 22 is used (step S13).

Next, the PLC1 sends the instruction of performing the end effector replacement to the slave device 21, and the slave device 21 operates according to the instruction. Specifically, the operation proceeds in the following flow of steps S14-S23.

First, the PLC1 makes an instruction to the slave device 21 to remove the end effector 22 and restores the end effector 22 to a predetermined mounting position (position A) (step S14). Accordingly, the slave device 21 moves so that the attachment part of the end effector in the slave device 21 is located in the position A (step S15). Next, the PLC1 makes an instruction to the slave device 21 to remove the end effector 22 (step S16). Accordingly, the slave device 21 removes the end effector 22 (step S17). Next, the PLC1 makes an instruction to the slave device 21 to move so that the attachment part is positioned in a mounting position (position B) of the end effector 23 (step S18).

Next, the slave device 21 moves so that the attachment part is positioned in the position B (step S19). Step S20 and S21 are performed concurrently with step S19. First, the PLC1 makes an instruction to the slave device 21 to change the communication setting in the communication part 211 to the one most suitable for the communication between the communication part 211 and the end effector 23 (step S20). In accordance with this instruction, the communication setting change part 213 changes the communication setting in the communication part 211 to the one most suitable for the communication between the communication part 211 and the end effector 23 (step S21).

After steps S19 and S21, the PLC1 makes an instruction to the slave device 21 to mount the end effector 23 (step S22). Then, the slave device 21 mounts the end effector 23 (step S23).

After step S23, the slave device 21 performs a predetermined operation using the end effector 23 (step S24).

Figure 8:
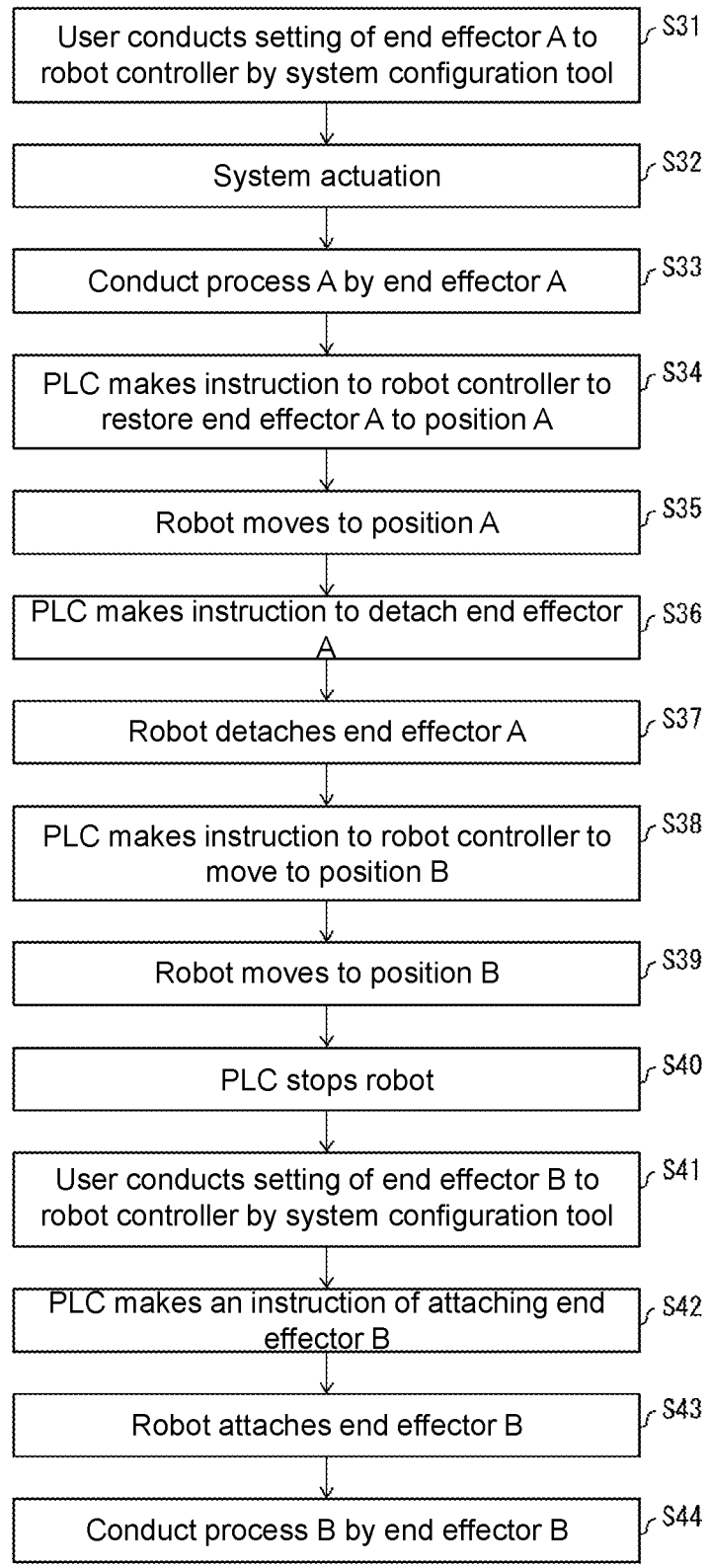
FIG. 8 is a flow chart showing a flow of an operation of an industrial network system of a comparative example.

FIG. 8 is a flow chart showing a flow of the operation of an industrial network system in a comparative example. The industrial network system in the comparative example is the industrial network system 100 without the communication setting change part 213. In the following part, for the sake of brief description, the flow of the operation of the industrial network system in the comparative example is described with reference to the same symbols as members of the industrial network system 100.

First, the user uses the system configuration tool 5 to change the communication setting in the communication part 211 to the one most suitable for the communication between the communication part 211 and the end effector 22 (step S31). Next, steps S32-S39 are performed sequentially and steps S32-S39 are respectively the same as the above steps S12-S19.

After step S39, the PLC1 stops the movement of the slave device 21 according to the instruction (step S40). Next, the user uses the system configuration tool 5 to change the communication setting in the communication part 211 to the one most suitable for the communication between the communication part 211 and the end effector 23 (step S41). Next, steps S42-S44 are performed sequentially and steps S42-S44 are respectively the same as the above steps S22-S24.

The industrial network system 100 does not require the user operation corresponding to step S41, and thus the working hours of the user in the operation can be reduced compared with the industrial network system in the comparative example. Besides, the industrial network system 100 performs step S19 and steps S20-S21 concurrently; accordingly, compared with the industrial network system in the comparative example, the operation time can be shortened and the operation rate can be improved.

Moreover, the industrial network system 100 may be a network in accordance with the standard of EtherNet/IP (registered trademark); in this case, an EDS (Electronic Data Sheet) file may be considered as an example of the definition file 6. In addition, the industrial network system 100 may be a network in accordance with the standard of Modbus (registered trademark); in this case, a Modbus model definition file may be considered as an example of the definition file 6.

In addition, it is obvious that besides the whole industrial network system 100, the single slave device 21 and the single PLC1 are also included in the scope of the disclosure.

[Implementation Example Realized by Software]

A control block of the slave device 21 may be realized by a logic circuit (hardware) formed into an integrated circuit (IC chip) and the like, or by a software.

In a case of the software, the slave device 21 includes a computer which executes commands of a program in the form of software fulfilling various functions. The computer includes more than one processor for example, and includes a computer-readable recording medium which stores the program. Then, in the computer, the processor reads the program from the recording medium and executes the program, thereby achieving the effect of the disclosure. The processor may be, for example, a central processing unit (CPU). The recording medium may be, besides "a non-transient tangible medium" such as a read only memory (ROM), a tape, a disk, a card, a semiconductor memory, a programmable logic circuit and so on. In addition, a random access memory (RAM) and the like which develop the program may be further included. In addition, the program may be supplied to the computer via any transmission medium (communication network, broadcast wave or the like) capable of transmitting the program. Moreover, one aspect of the disclosure may be realized in the form of a data signal embedded in a carrier wave in which the program is embodied by electronic transmission.

According to the above configuration, when the end effector after replacement is one of the plurality of attachable end effectors, in the timing of the end effector replacement, the communication setting change part changes the communication setting in the communication part according to the communication information which corresponds to the end effector after replacement. Accordingly, in the timing, the communication setting of the communication part is automatically changed to the one which is most suitable for the communication between the communication part and the end effector after replacement. As a result, it is not necessary for the user to perform setting to the slave device every time the communication form between the slave device and the end effector before replacement is different from the communication form between the slave device and the end effector after replacement. Therefore, in the industrial network system, the working hours of the user in the operation can be reduced. In addition, even if the industrial network system is not stopped temporarily, the setting related to the communication form between the slave device and the end effector after replacement can be performed. As a result, the operation rate of the industrial network system can be improved.

In addition, in the slave device of another aspect of the disclosure, the communication setting change part changes the communication setting in the communication part concurrently with the movement of the slave device conducted during the end effector replacement.

According to the above configuration, the communication setting change part changes the communication setting in the communication part concurrently with the movement of the slave device conducted during the end effector replacement. Accordingly, the timing for finishing both the end effector replacement and the change of communication setting can be quickened.

In addition, in the slave device of another aspect of the disclosure, when one predetermined command is received from a host device, the end effector replacement and the change of the communication setting in the communication part done by the communication setting change part are performed collectively.

According to the above configuration, the end effector replacement and the change of communication setting can be conducted by one command. Therefore, a slave device which is easier for the user to handle can be realized.

In addition, the slave device of another aspect of the disclosure includes a priority control part which controls priority of tasks in the communication setting change part, and when the time for the communication setting change part to change the communication setting in the communication part is longer than the time required for the movement of the slave device conducted in the end effector replacement, the priority control part raises the priority of the tasks in the communication setting change part.

According to the above configuration, the time to perform the change of communication setting can be shortened (or be eliminated) no matter the change of communication setting is before or after the end effector replacement. Accordingly, the timing for finishing both the end effector replacement and the change of communication setting can be quickened.

In addition, in the slave device of another aspect of the disclosure, when the end effector after replacement is not one of the plurality of attachable end effectors, in the timing of the end effector replacement, the communication setting change part automatically and sequentially changes the communication setting in the communication part according to the communication information related to each of the plurality of attachable end effectors, until the communication part is communicable with the end effector after replacement.

According to the above configuration, even in a case of an end effector of which the communication information is not stored in the storage part, the effect equivalent to the case of the end effector of which the communication information is stored in the storage part can be obtained.

According to the above configuration, the master device of one aspect of the disclosure can send an instruction of performing the end effector replacement to the slave device and actuate the communication setting change part of the slave device using the instruction as a trigger. Therefore, according to the above configuration, a master device of one aspect of the disclosure which is capable of actuating the slave device can be realized.

According to the above configuration, an industrial network system capable of actuating the slave device of one aspect of the disclosure by the master device can be realized.

According to one aspect of the disclosure, in the industrial network system, the working hours of the user in the operation can be reduced and the operation rate can be improved.

The disclosure is not limited to the embodiments described above, various changes can be made within the scope defined by the claims, and embodiments obtained by appropriately combining the technical means disclosed respectively in different embodiments are also included in the technical scope of the disclosure.

What is claimed is:

1. A slave device, which is related to an end effector replacement in which an end effector before replacement is removed from the slave device and an end effector after replacement is mounted on the slave device, comprising:
   a processor being configured to,
   communicate with the end effector after replacement mounted on the slave device after the end effector replacement;
   store, with regard to each of a plurality of attachable end effectors that are attachable to the slave device, communication information related to a communication form between the slave device and the attachable end effector; and
   automatically change a communication setting in the processor according to the communication information which corresponds to the end effector after replacement in a timing of the end effector replacement when the end effector after replacement is one of the plurality of attachable end effectors,
   the processor is further configure to control priority of tasks for the communication setting, and
   when the time for changing the communication setting in the processor is longer than the time required for the movement of the slave device conducted in the end effector replacement, the processor raises the priority of the tasks for the communication setting.

2. The slave device according to claim 1, wherein the processor changes the communication setting in the processor concurrently with the movement of the slave device conducted during the end effector replacement.

3. The slave device according to claim 2, wherein when one predetermined command is received from a host device, the end effector replacement and the change of communication setting in the processor are performed collectively.

4. The slave device according to claim 2, wherein when the end effector after replacement is not one of the plurality of attachable end effectors, in the timing of the end effector replacement, the processor automatically and sequentially changes the communication setting in the processor according to the communication information related to each of the plurality of attachable end effectors, until the processor is communicable with the end effector after replacement.

5. The slave device according to claim 1, wherein when one predetermined command is received from a host device, the end effector replacement and the change of communication setting in the processor are performed collectively.

6. The slave device according to claim 5, wherein when the end effector after replacement is not one of the plurality of attachable end effectors, in the timing of the end effector replacement, the processor automatically and sequentially changes the communication setting in the processor according to the communication information related to each of the plurality of attachable end effectors, until the processor is communicable with the end effector after replacement.

7. The slave device according to claim 1, wherein when the end effector after replacement is not one of the plurality of attachable end effectors, in the timing of the end effector replacement, the processor automatically and sequentially changes the communication setting in the processor according to the communication information related to each of the plurality of attachable end effectors, until the processor is communicable with the end effector after replacement.

8. A controller, which sends an instruction of performing the end effector replacement to the slave device according to claim 1.

9. An industrial network system, comprising:
   the slave device according to claim 1; and
   a controller which sends an instruction of performing the end effector replacement to the slave device.

* * * * *